United States Patent
Chan et al.

(10) Patent No.: US 6,489,399 B1
(45) Date of Patent: Dec. 3, 2002

(54) DYE-APPENDED POLYMERS FOR BROADBAND FIBER OPTIC DEVICES

(75) Inventors: Kwok Pong Chan, Troy, NY (US); David G. Gascoyne, Schenectady, NY (US); Janet L. Krahn, Clifton Park, NY (US); Gregory A. Wagoner, Watervliet, NY (US)

(73) Assignee: Molecular OptoElectronics Corp., Watervliet, NY (US)

( * ) Notice: Subject to any disclaimer, the term of this patent is extended or adjusted under 35 U.S.C. 154(b) by 0 days.

(21) Appl. No.: 09/628,887

(22) Filed: Jul. 31, 2000

(51) Int. Cl.$^7$ .............................. C08F 8/00; B32B 5/12
(52) U.S. Cl. .................. 525/191; 525/195; 358/901.1; 524/403; 524/405; 428/113; 428/288; 428/290
(58) Field of Search ................................ 525/195, 191; 358/901.1; 524/403, 405; 428/113, 288, 290

(56) References Cited

U.S. PATENT DOCUMENTS

| | | | |
|---|---|---|---|
| 3,328,323 A | 6/1967 | Vaughn | 260/18 |
| 4,201,446 A | 5/1980 | Geddes et al. | 350/96.29 |
| 4,343,532 A | 8/1982 | Palmer | 350/96.19 |
| 4,469,544 A | 9/1984 | Goodman | 156/345 |
| 4,469,554 A | 9/1984 | Turner | 156/657 |

(List continued on next page.)

FOREIGN PATENT DOCUMENTS

| | | |
|---|---|---|
| DE | 4005557 A1 | 8/1991 |
| DE | 301415 | 12/1992 |
| DE | 4343943 A1 | 6/1995 |
| EP | 0229456 A2 | 7/1987 |
| EP | 0686867 A1 | 12/1995 |

(List continued on next page.)

OTHER PUBLICATIONS

Fink, Donald G. and Christiansen, Donald, *Electronic Engineers 'Handbook*, Third Edition, Ch. 24, 14–18 (1989).

Mueller–Westerhoff, U.T. et al., "The Synthesis of Dithiolene Dyes with Strong Near–IR Absorption," *Tetrahedron* 47, 909–932 (1991).

McCallion, K. J. and Shimazu, M., "Side–Polished Fiber Provides Functionality and Transparency," *Optoelectronics World*, S19,S20,S22 and S24 (Sep. 1998).

Gordon et al., "Single Channel Attenuators," pending U.S. Patent Application Ser. No. 09/605,110, filed (Jun. 28, 2000).

Marlow Industries, Inc., "Design Guide—Power Supplies" and "Frequently Asked Questions" www.marlow.com.

(List continued on next page.)

*Primary Examiner*—Kriellion A. Sanders
(74) *Attorney, Agent, or Firm*—Heslin Rothenberg Farley & Mesiti, P.C.; Martha L. Boden, Esq.

(57) ABSTRACT

Novel dye/polymer compositions are disclosed, which when used in connection with fiber optic devices, provide a uniform spectral response across a broadband wavelength region. The dye/polymer compositions contain an infrared absorbing dye having an absorption maximum from about 900 to about 1300 nm. One or more polar olefin copolymers containing monomers derived from polar olefins having an ester, benzene, or halogen substitutent attached, is/are chemically bonded to the dye. Optionally, a detached polar olefin copolymer may be blended with the dye-appended copolymer. Also disclosed is a broadband optical device comprising the novel dye/polymer compositions formed over an optical fiber. Improvements in the uniformity of spectral response and performance are observed across a wavelength band. Variable optical attenuators, switches, shutters, and couplers can be designed which incorporate the dye/polymer compositions. The invention is particularly useful in the 1500–1700 nm wavelength band.

23 Claims, 2 Drawing Sheets

U.S. PATENT DOCUMENTS

| | | | | |
|---|---|---|---|---|
| 4,630,884 | A | 12/1986 | Jubinski | 350/96.15 |
| 4,630,890 | A | 12/1986 | Ashkin et al. | 350/96.3 |
| 4,704,151 | A | 11/1987 | Keck | 65/4.1 |
| 4,712,866 | A | 12/1987 | Dyott | 350/96.3 |
| 4,763,966 | A | 8/1988 | Suzuki et al. | 350/1.1 |
| 4,767,571 | A | 8/1988 | Suzuki et al. | 252/587 |
| 4,773,924 | A | 9/1988 | Berkey | 65/3.11 |
| 4,778,237 | A | 10/1988 | Sorin et al. | 350/96.15 |
| 4,786,130 | A | 11/1988 | Georgiou et al. | 350/96.15 |
| 5,067,788 | A | 11/1991 | Jannson et al. | 385/2 |
| 5,078,465 | A | 1/1992 | Dahlgren | 385/50 |
| 5,091,984 | A | 2/1992 | Kobayashi et al. | 385/16 |
| 5,106,394 | A | 4/1992 | Bramson | 51/309 |
| 5,136,818 | A | 8/1992 | Bramson | 51/165.72 |
| 5,231,135 | A | 7/1993 | Machell et al. | 525/123 |
| 5,265,178 | A | 11/1993 | Braun et al. | 385/24 |
| 5,266,352 | A | 11/1993 | Filas et al. | 427/163 |
| 5,290,398 | A | 3/1994 | Feldman et al. | 156/651 |
| 5,444,723 | A | 8/1995 | Chandonnet et al. | 372/14 |
| 5,493,629 | A | 2/1996 | Stange | 385/125 |
| 5,623,567 | A | 4/1997 | Barberio et al. | 385/30 |
| 5,673,351 | A | 9/1997 | Clarke et al. | 385/100 |
| 5,781,675 | A | 7/1998 | Tseng et al. | 385/30 |
| 5,853,969 | A | 12/1998 | Harada et al. | 430/510 |
| 5,966,493 | A | 10/1999 | Wagoner et al. | 385/140 |
| 6,011,881 | A | 1/2000 | Moslehi et al. | 385/10 |
| 6,095,905 | A | 8/2000 | Jameson et al. | 451/41 |
| 6,097,873 | A | 8/2000 | Filas et al. | 385/140 |
| 6,191,224 | B1 * | 2/2001 | Chan et al. | 525/191 |
| 6,205,280 | B1 | 3/2001 | Wagoner et al. | 385/140 |
| 6,238,274 | B1 | 5/2001 | Jameson et al. | 451/41 |
| 6,301,426 | B1 | 10/2001 | Jameson et al. | 385/140 |
| 6,303,695 | B1 | 10/2001 | Chan et al. | 525/195 |
| 6,335,998 | B2 | 1/2002 | Wagoner et al. | 385/140 |

FOREIGN PATENT DOCUMENTS

| | | |
|---|---|---|
| EP | 0919583 A2 | 6/1999 |
| EP | 1035680 A2 | 9/2000 |
| EP | 1037090 A2 | 9/2000 |
| EP | 1065821 A2 | 1/2001 |
| GB | 1257825 | 12/1969 |
| GB | 2190211 A | 11/1987 |
| GB | 2184859 A | 7/1997 |
| GB | 2351625 A | 1/2001 |
| GB | 2 190 211 A | 1/2002 |
| JP | 60-203904 | 10/1985 |
| JP | 06-114713 | 4/1994 |
| WO | WO 87/03676 | 6/1987 |
| WO | WO 89/01171 | 2/1989 |
| WO | WO 91/12555 | 8/1991 |
| WO | WO 93/02384 | 2/1993 |
| WO | WO 93/21245 | 10/1993 |
| WO | WO 95/02202 | 1/1995 |
| WO | WO 95/05617 | 2/1995 |
| WO | WO 00/49434 | 8/2000 |
| WO | WO 00/49438 | 8/2000 |
| WO | WO 00/49439 | 8/2000 |

OTHER PUBLICATIONS

Wagoner et al., pending U.S. patent application Ser. No. 09/139,832, filed Aug. 25, 1998, entitled "Blockless Techniques for Simultaneous Polishing of Multiple Fiber Optics".

Johnstone, W. et al., "Fibre Optic Modulators Using Active Multimode Waveguide Overlays" *Electronics Letters,* vol. 27, No. 11, pp. 894–896 (May 23, 1991).

Johnstone, W. et al., "Fiber–Optic Fefractometer that Utilizes Multimode Waveguide Overlay Devices," *Optics Letters,* vol. 17, No. 21, pp. 1538–1540 (Nov. 1, 1992).

McCallion, K. et al., "Investigation of Optical Fibre Switch Using Electro–Optic Interlays" *Electronic Letters,* vol. 28, No. 4, pp. 410–411 (Feb. 13, 1992).

Zhang, M. et al., "Single–mode fiber–film directional coupler" *Journal of Lightwave Technology,* vol. LT–5, No. 2, pp. 260–264 (Feb. 1987).

Bergh, R. A. et al., "Single–Mode Fibre Optic Directional Coupler," *Electron. Lett.* 16 (7), 260–261 (Mar. 1980).

Birks, T.A. and Li, Y.W., "The Shape of Fiber Tapers," *IEEE J. Lightwave Techn.* 10 (4), 432–438 (Apr. 1992).

Brophy, T.J. et al., "Formation and Measurement of Tapers in Optical Fibers," *Rev. Sci. Instrum.* 64 (9), 2650–2654 (Sep. 1993).

Carrara, S. L. A. et al., "Elasto–Optic Alignment of Birefringent Axes in Polarization–Holding Optical Fiber," *Opt. Lett.* 11 (7), 470–472 (Jul. 1986).

Cordaro, M. H. et al., "Precision Fabrication of D–Shaped Single–Mode Optical Fibers by in Situ Monitoring," *IEEE J. Lightwave Techn.,* 12, (9) 1524–1531 (Sep. 1994).

Diez A. et al., "Cynlindrical Metal–Coated Optical Fibre Devices for Filters and Sensors," *Electron. Lett.* 32 (15), 1390–1392 (Jul. 1996).

Digonnet, M. J. F., et al., "Measurement of the Core Proximity in Polished Substrates and Couplers," *Opt. Lett.* 10 (9), 463–465 (Sep. 1985).

Gowar, J., *Optical Communication Systems,* Ch.3, 58–77 (2d Ed. 1993).

Hussey, C.D. and Minelly, J.D., "Optical Fibre Polishing with a Motor–Driven Polishing Wheel," *Electron. Lett.* 24, 805–807 (Jun. 1988).

Kenny, R.P. et al., "Control of Optical Fibre Taper Shape," *Electron. Lett.* 27 (18), 1654–1656 (Aug. 1991).

Love, J.D. and Henry, W.M. "Quantifying Loss Minimisation in Single–Mode Fibre Tapers," *Electron. Lett.* 22 (17), 912–914 (Aug. 1986).

Morozov V. et al., "Fused Fiber Optic Variable Attenuator," *OFC 2000, 25th Annual Optical Fiber Commincations Conference,* 22–24 (Mar. 10, 2000).

Leminger, O.G. and R. Zengerle, "Determination of Single–Mode Fiber Coupler Design Parameters from Loss Measurements," *IEEE J. Lightwave Techn..,* LT–3 (4), 864–867 (Aug. 1985).

Pan, Ru–Pin et al., "Voltage–Controlled Optical Fiber Coupler Using a Layer of a Low–Refractive–Index Liquid Crystal with Positive Dielectric Anisotrophy," *Jpn. J. Appl. Phys.* 34, Part 1, No. 12A, 6410–6415 (Dec. 1995).

Parriaux, O. et al., "Distributed Coupling on Polished Single–Mode Optical Fibers," *Appl. Opt.* 20, 2420–2423 (Jul. 1981).

Todd, D.A. et al., "Polarization–Splitting Polished Fibre Optic Couplers," *Optical Engineering* 32 (9), 2077–2082 (Sep. 1993).

* cited by examiner

DYE-APPENDED POLYMERS FOR BROADBAND FIBER OPTIC DEVICES

TECHNICAL FIELD

The present invention relates to dye-appended polymeric materials for use in broadband fiber optic device applications.

BACKGROUND OF THE INVENTION

Dense wavelength division multiplexed (DWDM) optical networks increase their transmission capacity by employing multiple co-propagating, discrete, wavelength channels, each carrying independent data streams. Broadband fiber optic devices, such as variable attenuators, couplers, and switches having a controllable spectral response, are critical components of DWDM systems. Currently, DWDM systems operate in the 1550 nm spectral region because of the availability of optical amplifiers containing erbium-doped optical fibers. However, as amplifier technology develops, and capacity demands increase, DWDM systems are expected to expand their spectral extent and increase their channel density.

Optical power, as it propagates in a single-mode optical fiber, or any other waveguide or bulk material, experiences dispersion, i.e. differing wavelengths propagate at different speeds. In an optical fiber, modal extent and phase velocity are affected by both the dispersion of the coupling material and the dispersion of the waveguide causing the light to pass through at different speeds. Thus, across a given wavelength region, differences between the dispersions of the material and waveguide through which light propagates can result in nonuniform spectral performance of fiber-based devices.

Dispersion is often represented in terms of a material's refractive index (n) as a function of optical wavelength ($\lambda$), i.e. as n($\lambda$). In dispersive materials, the refractive index of the material changes with wavelength. The relevant parameter when describing modal dispersion or multimode distortion in optical fibers is the effective mode dispersion, $n_{eff}(\lambda)$, which, in simple waveguide geometries, can be calculated using the material dispersion of the fiber's cladding and core, $n_{clad}(\lambda)$ and $n_{core}(\lambda)$, respectively, and geometric parameters. The relationships between dispersion, refractive index, wavelength, and spectral performance for fiber optic devices and polymer overlays are fully disclosed in copending commonly assigned U.S. patent application Ser. No. 09/139,457 filed Aug. 24, 1998.

As represented herein, "$n_{eff}(\lambda)$" refers to the effective mode dispersion for a silica glass optical fiber having a core with a slightly raised refractive index relative to the surrounding cladding. The term "dispersion" refers to the slope of the line formed from a plot of a material's change in refractive index versus change in wavelength. Although all materials are dispersive to some extent, a hypothetical material exhibiting no dispersion would be represented as a horizontal line (slope=0). The greater the dispersion, the steeper the slope (negative or positive). The slope of $n_{eff}(\lambda)$ is negative, and thus, a single mode optical fiber is dispersive.

Fiber-based devices frequently exhibit spectrally nonuniform performance, which is undesirable in many broadband device applications. Examples include side-polished fiber (SPF)- and tapered fiber-based attenuators wherein a coupling oil ($n_D$=1.456 at 27.9° C.) placed on the optical fiber induces power loss (attenuation), as disclosed in commonly assigned U.S. Pat. No. 5,966,493. However, the attenuation is not uniform across the spectral region because the dispersion of the oil, $n_{oil}(\lambda)$, is mismatched to that of the fiber, $n_{eff}(\lambda)$, ie. the slope of $n_{oil}(\lambda)$ differs from that of $n_{eff}(\lambda)$. By contrast, if the dispersions were matched, corresponding dispersions would be approximately parallel, and the attenuation would be almost constant or substantially uniform across the wavelength band with only small variations being observed. Thus, a plot of attenuation (dB) vs. wavelength would result in a substantially horizontal line (slope=0) indicating uniform spectral response for dispersion-matched materials.

As disclosed in the aforementioned U.S. Pat. No. 5,966,493, certain organic polymers having an index of refraction close to that of the fiber can be applied to the exposed surface of a SPF optic (or a tapered fiber optic) for use in variable optical attenuators. Such polymers exhibit a change in refractive index proportional to a change in temperature. OPTI-CLAD®145, which is available from Optical Polymer Research, Inc. is an example of such a polymer. Although the refractive index of such organic polymer materials can be altered at a given wavelength to match that of the fiber, the use of these polymers is limited in broadband applications because of the dispersion mismatch between the polymer and the fiber across the wavelength band of interest.

One solution to these problems of dispersion-mismatch and nonuniform spectral response is provided in the aforementioned U.S. patent application Ser. No. 09/139,457, which discloses the use of polar polyolefin copolymers having certain infrared absorbing dyes incorporated therein. Surprisingly, use of these novel materials permits dispersion to be controlled from very large differences to almost no difference in dispersion between the dye/polymer composition and the fiber optic. The refractive index of the dye/polyolefin formulations disclosed in the application can also be altered to match or differ from that of the optical fiber. These dispersion-controlled, refractive index-controlled dye/polymer compositions are particularly useful in the fabrication of spectrally uniform fiber optic devices such as VOAs, couplers, and switches for use in broadband applications, such as in the 1500–1600 nm region, where control of spectral response is important.

Although the dye-doped polymer compositions disclosed in the above patent application provide an excellent solution to the dispersion matching problem for the aforementioned devices, rigorous efforts have continued with the goal of developing even better materials. For example, due to the limited solubility of the dye, attention to the amount of dye introduced into these polymers is particularly important. Phase separation of the dye from the polymer may occur if the weight percentage ranges disclosed in the application are not adhered to. Thus, it would be advantageous to develop dye/polymeric materials having improved thermal stability and phase stability. Such formulations should exhibit greater long term reliability and improved durability making them even more commercially valuable. In addition, if solubility concerns can be eliminated, then it may be possible to use other polymers, not previously employed, in the formulations. At the same time, it remains important to maintain a uniform spectral response across a broad wavelength range.

SUMMARY OF THE INVENTION

The present invention meets the aforementioned needs and is based on the unexpected discovery that certain dye-appended polymeric materials, in which the dye and polymer are chemically bonded together, eliminate solubility issues associated with doped systems. Thus, phase separation of the dye from the polymer is no longer a concern, and larger amounts of dye can be incorporated into the compositions. The present compositions provide improved control/correction of dispersion mismatch between the polymer and the fiber optic, and therefore, spectral flatness across a given wavelength band. In addition, because the issue of phase separation has been eliminated, polymers free of any dye can also be added to the dye-appended polymers of the present invention to obtain an even better (more uniform) spectral response over a broader wavelength range (e.g., 1500 nm to 1700 nm). Thus, the novel dye-appended polymer formulations of the present invention with and without additional copolymers mixed therein are particularly useful in the fabrication fiber optic devices exhibiting spectrally uniform performances, such as variable optical attenuators (VOA)s, couplers, shutters, and switches. Furthermore, the present dye-appended polymeric compositions can be used at longer wavelengths, up to about 1700 nm.

Accordingly, in one aspect, the present invention is a dye/polymer composition comprising:
(a) an infrared absorbing dye component having an absorption maximum from about 900 to about 1300 nm; and
(b) a copolymer component comprising at least one appended polar olefin copolymer chemically bonded to the dye component through a linking moiety attached to one chain end of the copolymer. Each appended polar olefin copolymer comprises monomeric units derived from two or more polar olefins having an ester, benzene or halogen substituent attached thereto.

Exemplary component concentrations are from about 0.2 to about 10% by weight of the infrared absorbing dye component and from about 90 to about 99.8% by weight of the copolymer component. The copolymer component optionally includes a detached polar olefin copolymer mixed with the dye-appended polymer, such that the aforementioned weight percentage of the copolymer component also includes that of the detached copolymer. In the detached copolymer, the monomeric units are also derived from two or more polar olefins having an ester, benzene or halogen substituent attached thereto.

Considering both embodiments, the dye/polymer composition of the present invention therefore contains:
from about 10 wt.% to about 100 wt. % of the dye-appended polar olefin copolymer, which comprises the dye moiety chemically bonded to one or more of the appended polar olefin copolymers through a linking moiety); and
from about 0 to about 90 wt. % of the detached polar olefin copolymer.

In another aspect, the present invention is an optical device comprising a portion of an optical fiber through which optical energy can propagate. The portion of the optical fiber has a surface through which at least some of the optical energy can be extracted, and the novel dye/polymer composition overlies this surface. The spectral response of the optical device across a wavelength band of interest may be controlled by controlling the material dispersion relative to the effective mode dispersion. For uniform spectral response, the material dispersion substantially matches the effective mode dispersion.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DESCRIPTION OF THE PREFERRED EMBODIMENTS

Based on the present invention, improvement in spectral performance across a wavelength band is possible by controlling and correcting (if desired) dispersion mismatch between an overlying polymer and an optical fiber. This control is possible by appending an infrared absorbing dye to the polymer overlay, and if necessary, blending an additional polymer into the composition. The present dye/polymer compositions can be used to develop novel fiber optical devices, such as attenuators, switches, shutters, and couplers.

Infrared absorbing dye components useful in the present polymer compositions include dye moieties having an absorption maximum from about 900 to about 1300 nm. Illustrative examples of such dye moieties include, but are not limited to, dithiolate metal-based complex dyes having structures (I)–(V)

(I)

In structures (I)–(V), each wavy line indicates a point of attachment from the dye to a linking group at the end of a polar olefin copolymer component, thereby appending the dye to the copolymer. Each $R^1$ is independently a "lower alkyl", which refers to saturated hydrocarbon residues containing one to twelve carbons in straight or branched chains, as well as cyclic structures when possible. "Met" refers to a Group VIIIB metal, such as nickel, palladium or platinum. In structure (V), Z may be oxygen (O) or sulfur (S), and n is 2 to 12. Bis(1,2-diaryl-ethylenedithiolate) metal-based complexes of structure (I) can be prepared using the method provided in Examples 1–4. Procedures for preparing dye moieties (II)–(V) are illustrated in Examples 5–8. It should be noted that the present invention is not limited to the use of structural moieties (I)–(V), and other suitable dye moieties will be obvious to those of skill.

The attachment of the dye component, such as moiety (I)–(V), to the copolymer(s) causes an increase in refractive index relative to the refractive index of the copolymer alone. This increase will depend on the amounts and types of dye and copolymer component present in the polymer composition. Typically, the amount of dye moiety in the composition ranges from about 0.2 to about 10% by weight. Furthermore, the dispersion of a polymer composition in relation to an underlying fiber optic can be adjusted by varying the amount of the infrared absorbing dye so as to produce a spectrally flat optical response across a broad wavelength band (dispersion matched) or instead, a varying dispersion. For dispersion matching, which translates into uniform spectral performance, the refractive index of the copolymer is generally selected to be lower than that of the optical fiber, so that the dye, when chemically bonded to the copolymer(s), adjusts the refractive index of the composition to a value that is typically within about 0.5% of the effective mode refractive index ($n_{eff}$) of the fiber. Often, however, the value of the material refractive index will be within about 0.2% of the effective mode refractive index, or even within about 0.15%. For spectral uniformity, the material dispersion of the dye/copolymer composition is usually within about 25% of that of the fiber optic. The method for controlling dispersion in a dye/polymer composition is thoroughly discussed in the aforementioned patent application.

The polar olefin copolymers included in the novel polymer compositions of the present invention, both for use as dye-appended copolymers and detached copolymers, are copolymers containing monomeric units derived from two or more polar olefins having an ester, benzene, or halogen substituent attached thereto. Conventionally, the term "polar" refers to the property in which the positive and negative electrical charges of the olefin monomers are permanently separated, and the term "olefin" refers to the class of unsaturated aliphatic hydrocarbons having one or more double bonds. Polar olefin copolymers, also referred to herein as "polyolefins", are easily synthesized from a variety of commercially available polar olefin monomers using conventional polymerization reactions, such as the one described in the examples below.

Illustrative useful monomers for inclusion in the dye-appended and detached polyolefins include for example, monomers derived from tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N, N-dimethylacrylamide, pentafluorophenyl methacrylate, methyl methacrylate, and vinylidene chloride. As previously stated, for use in controlling dispersion, a polyolefin, for subsequent attachment to the dye moiety, is desired which has a refractive index close to, but lower than, that of the optical fiber (effective mode refractive index, $n_{eff}$). Then, after attaching to the dye, the refractive index of the dye-appended copolymer is raised to be within the aforementioned percentages of the effective mode refractive index of the optical fiber. For a standard glass fiber optic having an 8.3 μm diameter core region of slightly raised refractive index surrounded by a 125±1 μm fused silica cladding, the effective mode refractive index, $n_{eff}$, at 1500 nm, is about 1.4466, and at 1600 nm, is about 1.4455.

Typically, the refractive index of the unattached polyolefin alone has a value within about 1% of the effective mode refractive index of the fiber.

Table 1 provides refractive index values, $n_D$, where subscript D denotes the Sodium D-Line wavelength ($\lambda$=589 nm), for a variety of polar olefin monomers at room temperature (20–25° C.). By adjusting the ratio and types of olefin monomers included in the polyolefin, the refractive index of the copolymer can be precisely controlled. Thus, there are many possible combinations of polar olefins that can be used to form polar polyolefins having a desirable refractive index. The relative amounts of polar olefin monomers contained in the polyolefin can be represented as ratios or in terms of percent by weight ("% by weight" or "wt. %"). However, the invention is not limited to the use of the monomers listed above and in Table 1, and additional useful polar olefin monomers having an ester, benzene or halogen substituent attached thereto that can be used to obtain the desirable base refractive index would be obvious to one of skill.

TABLE 1

| Monomer Description | Refractive Index ($n_D$) |
|---|---|
| tetrafluoropropyl acrylate | 1.400 |
| tetrafluoropropylmethacrylate | 1.400 |
| butyl acrylate | 1.418 |
| hexyl acrylate | 1.428 |
| trifluoroethyl methacrylate | 1.437 |
| lauryl acrylate | 1.445 |
| pentafluorostyrene | 1.450 |
| pentafluorophenyl acrylate | 1.470 |
| methyl acrylate | 1.472 |
| N,N-dimethylacrylamide | 1.473 |
| pentafluorophenyl methacrylate | 1.487 |
| methyl methacrylate | 1.489 |
| vinylidene chloride | 1.600 |

It should be noted that the refractive index of the resulting polar olefin copolymer can also be altered by heating or cooling the polymer to a temperature above or below its initial temperature or by controlling the molecular weight of the polymer. An increase in the temperature of the polymer will lower the refractive index, and a decrease in the temperature of the polymer will increase the refractive index. The molecular weight of the polyolefin can be regulated by controlling the amount of chain terminating agent added during polymerization. To be useful, the dye/polar olefin polymer compositions of the present invention usually contain polyolefins having a molecular weight (Mn) ranging from about 1,500 g/mole to about 100,000 g/mole, but more typically the molecular weight ranges from about 1,500 g/mole to about 30,000 g/mole. Thus, the copolymer composition, temperature, and molecular weight each effect the refractive index, and the temperature at which attenuation begins is effected by the copolymer's refractive index.

Included in the present invention are two exemplary embodiments for the dye-appended polymer composition. In the first, each polar olefin copolymer appended to the dye is a long polymer chain having a high molecular weight, such as 10,000 g/mole or higher. In this case, dispersion matching between the dye-appended polymer composition and the fiber optic may be obtained without mixing in an additional detached copolymer. In the case of an attenuator, substantial spectral uniformity or spectral flatness within about 0.5 dB, but often <0.2 dB, across the 1500–1700 nm wavelength region at –15 dB attenuation can be achieved using such a dispersion matched dye-appended copolymer as an overlay. This observed spectral uniformity indicates dispersion matching between the fiber optic and the overlying dye-appended copolymer. In this embodiment, after chemically bonding the polar olefin copolymer to the dye through a linking moiety, the dye-appended polymer composition contains from about 90.0 to about 99.8% by weight of the appended polar olefin copolymer and from about 0.2 to about 10% by weight of the dye component.

An example of a dye-appended copolymer included in the present invention is depicted in the following structure (VI):

(VI)

wherein the infrared absorbing dye component is structural moiety (I), and each $R^1$ is methyl. The linking moiety is structure (L)

(L)

wherein the wavy line on the left side of structure (L) indicates the point of attachment to one end of the copolymer, and the wavy line on the right side of structure (L) indicates the point of attachment to structural dye moiety (I). Furthermore, ($A^1$) and ($A^2$) each independently represent monomeric units of the appended polar olefin copolymer. The mole fraction of monomer units ($A^2$) included in the copolymer is given by x, which has a numeric value from 0.1 to about 0.9, and the mole fraction of monomeric units ($A^1$) is (1−x). An example of a useful dye-appended copolymer having structure (VI), is structure (1) of Example 10, wherein ($A^1$) is a derivative of methyl acrylate, ($A^2$) is derived from tetrafluoropropyl acrylate, and Met is platinum. In Example 10, x is about 0.2, and 1−x is about 0.8.

In the second embodiment of the present invention, a polyolefin (detached polar olefin copolymer) is blended with the dye-appended copolymer when the spectral response of the dye-appended copolymer is observed to increase across the wavelength band. The monomers included in the detached copolymer are selected from those listed above with respect to the dye-appended copolymer. The detached copolymer often comprises, but is not limited to, the same monomer composition as the dye-appended copolymer. An example of such a detached copolymer is provided by structure (VII)

$$-(A^2)_{x}-(A^1)_{1-x}-S-C_{12}H'_{25} \quad \text{(VII)}$$

In this example, when (VII) is combined with dye-appended copolymer (VI), the monomers $A^1$ and $A^2$, and the weight fractions, x and (1−x) are the same in structures (VI) and (VII). However, as previously stated, the detached copolymers may differ in composition from those appended to the dye.

With respect to the spectral response of an attenuator across a wavelength band, any increase greater than about 0.5 dB from the desired attenuation would require addition of the detached copolymer to the dye-appended copolymer composition. Addition of this detached copolymer to the composition uniformly flattens the spectral response (within 0.5 dB, but often less than 0.2 dB) across the wavelength band by correcting the dispersion mismatch between the dye-appended copolymer and the underlying optical fiber (and by controllably lowering the refractive index of the resulting dye/polymer composition). The detached copolymer is mixed with the dye-appended polymer in an amount that will achieve this substantially uniform spectral flatness. In this second embodiment, the dye/polymer composition contains from about 90.0 to about 99.8% by weight of the polymer component, which comprises both the appended polar olefin copolymer and the detached polar olefin copolymer. The amount of the dye moiety in the composition ranges from about 0.2 to about 10% by weight.

The amount of detached copolymer to be mixed with the dye-appended copolymer for dispersion matching and constant spectral performance across a wavelength band is based on experimental measurements taken separately in connection with each of the copolymers. For example, the spectral response across a particular wavelength region for a fiber optic device having an overlay may be measured. First, measurements are taken using the dye-appended copolymer alone as the overlay. To illustrate, assume the increase in attenuation from 15 dB is +5 dB. This measured nonuniformity from 15 dB for the dye-appended copolymer is represented as $a^1$. Next, the attenuation is measured under the same conditions using the detached polyolefin as the overlay. As previously mentioned, the polyolefin may comprise the same monomeric units in the same amounts as those included in the dye-appended polyolefin(s). However, because the polymer contains no dye, the measurement, $a^2$, will be negative, e.g. $a^2 = -3$ dB.

The relationship between these measurements for determining the final dye/polymer composition may be expressed by the following equation:

$$a^1 m + (1-m)(a^2) = 0$$

wherein m is the weight fraction of the dye-appended polymer, and (1−m) is the weight fraction of the detached copolymer. For this example, the equation becomes:

$$5m + (1-m)(-3) = 0$$

$$m = 0.37$$

Thus, for a fiber optic attenuator at 15 dB of attenuation, to obtain a substantially uniform spectral response or spectral flatness equal to zero, 0.37 g of the dye-appended copolymer should be mixed with 0.63 g of the detached copolymer. In practice, however, values within about 0.5 dB, but more often less than about 0.2 dB are observed and considered to be substantially uniform. However, It may be necessary to perform 2–3 iterations of the above process to reach the desired spectral uniformity.

After following this procedure for a particular dye/polymer composition, one may alternatively prepare future batches of the same composition by approximation. For example, in the above composition, about 2 parts by weight of the dye-appended copolymer, such as structure (VI) can be mixed with about 1 part by weight of the detached copolymer, such as structure (VII). Then, after positioning the resulting dye/copolymer composition on a fiber optic, e.g., of an attenuator, the spectral response is measured. Adjustments in the relative amounts of the copolymers (VI) and (VII) in the mix can then be made until a uniform spectral response across the wavelength range is obtained. Addition of dye-appended copolymer increases, and addition of the detached copolymer lowers the variance from the desired response. Depending on the dye selected and the weight percentage used in the composition, as well as the identity and amounts of the monomers contained in the copolymers, the weight ratio for a particular dye-appended copolymer to the detached copolymer can vary from the aforementioned 2:1 ratio. For example, ratios ranging from about 1:10 to about 10:1 are possible.

The present invention also includes a broadband fiber optical device particularly useful across the wavelength band 1500–1700 nm. The present device incorporates the novel dye/polymer compositions described above, which are positioned over a surface of an optical fiber (e.g., side-polished or tapered) through which at least some of the optical energy passing through the fiber can be extracted. As a result of incorporating the present polymer compositions into the structure, the dispersions of the fiber and dye/polymer composition overlay can be controlled to be substantially matched, if desired, independent of the wavelength used. Because such a device is insensitive to the wavelength of light propagating through the fiber, a constant response is observed across the entire wavelength band of interest. Use of this technology enables the design of novel devices, such as attenuators, couplers, shutters, and switches.

Figure 1:
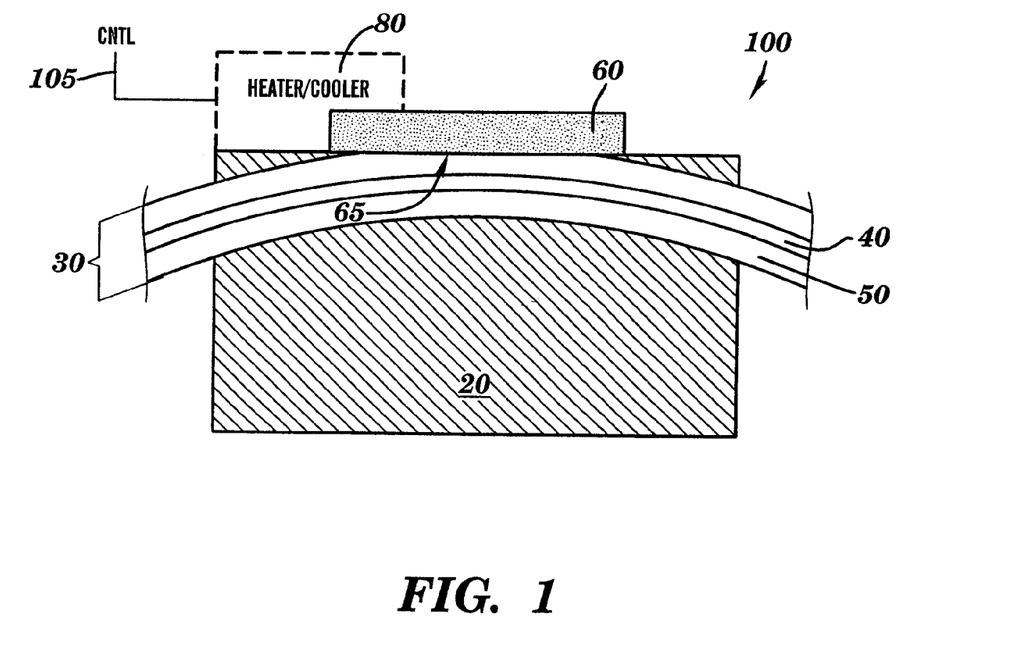
FIG. 1 is a side, cross-sectional view of an optical device depicting a side-polished optical fiber and a dye-appended polymer composition, wherein the optical fiber is mounted in a block, in accordance with the present invention.

In accordance with the present invention, FIG. 1 is a side, cross-sectional view of an optical device 100, such as an attenuator, for transmitting optical energy at any selected wavelength within a broadband wavelength region, typically from about 1500 nm to about 1700 nm. Shown in FIG. 1, is a portion of a single-mode optical fiber (e.g., telecommunications Corning SMF-28) 30 having a surface 65 through which at least some of the optical energy propagating through the fiber can be extracted. The fiber may be side-polished, as shown, through its cladding 50 close to its core 40, thereby exposing, through surface 65, an evanescent tail of the optical energy transmitted in the fiber. The remaining cladding thickness is generally < about 10 μm. Alternatively, the fiber may be tapered (not shown), as disclosed in copending commonly assigned U.S. application Ser. No. 09/539,467 filed on Mar. 30, 2000, and optical energy can be extracted through a surface (not shown, but corresponding to surface 65) in the tapered portion of the fiber. However, the invention is not limited to the use of side-polished optical fibers or tapered fibers, and other fibers having a surface 65 through which optical energy can be extracted may be used. Fiber 30 has an effective mode refractive index at each wavelength across the wavelength band.

Novel dye/polymer composition 60 of the present invention, which as described above includes a dye-appended polar olefin copolymer, and optionally, a detached polar olefin copolymer mixed therewith, overlies polished surface 65 of the fiber cladding. Optical energy propagating through the fiber can then be extracted from the fiber core by dye/polymer composition 60.

In the first embodiment, discussed above, a substantially uniform spectral response may be obtained when dye/polymer composition 60 is simply the dye-appended copolymer, particularly if the copolymer component has a molecular weight of 10,000 g/mole or more. In the second embodiment, a detached polar olefin copolymer is added to the composition, and dye/polymer composition 60 of FIG. 1 then includes this mixture of materials. The additional polyolefin remains detached from the dye component. In terms of weight %, the polymer component of dye/polymer composition 60 includes both the appended copolymer as well as the detached copolymer.

Using controllable heating/cooling source 80 in operative contact with dye/polymer composition 60, the overlay material is controllably heated/cooled to a temperature that controllably varies the material refractive index of composition 60. As previously stated, an increase in temperature will decrease the refractive index of dye/polymer composition 60, and a decrease in temperature will cause an increase. In addition to the heating/cooling source 80, a sensor (not shown) can be placed in material 60, to measure the resultant temperature thereof The signal representing the temperature can be carried from the device using sense leads (not shown), and controllable heating/cooling source 80 can be operated using control lead 105. In one exemplary embodiment, controllable heating/cooling source 80 is a thermo-electric cooler (TEC) (Melcor part number FC0.45-4-05), and the thermal sensor is a thermistor (Fenwell Electronics part number 112-503JAJ-B01). However, the invention is not limited to the use of these appliances, as will be obvious to those of skill.

Side-polished optical fiber 30 of FIG. 1 may be fabricated by lapping and polishing techniques. Using this technique, the fiber is typically embedded in a fused silica substrate block 20 containing a controlled radius groove. Material is carefully removed from a portion of fiber cladding 50 until core 40 is approached. At this point, the evanescent field of the optical energy propagating through the optical fiber can be accessed through surface 65 and propagate through dye/polymer composition 60. The device interaction length can be controlled by the remaining cladding thickness and the groove's radius of curvature.

The broadband fiber optic device of the present invention may be used in connection with the architectural designs disclosed in U.S. Pat. No. 5,966,493, wherein the portion of the optical fiber is embedded in a block, as shown in FIG. 1, and in copending commonly assigned U.S. patent application Ser. Nos. 09/139,787 and 09/139,832, wherein the portion of the optical fiber is suspended in a housing. This latter design is illustrated in FIG. 2.

Figure 2:
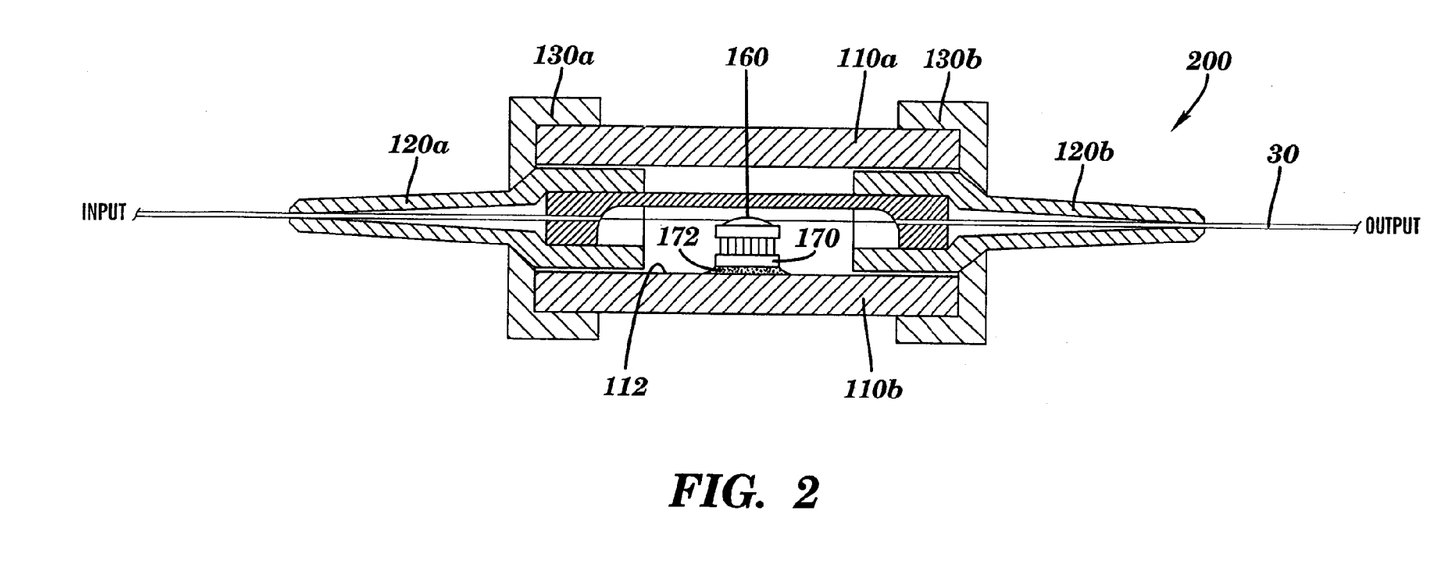
FIG. 2 is a side, cross-sectional view of an optical device depicting a side-polished optical fiber and a dye-appended polymer composition, wherein the optical fiber is suspended from a housing, in accordance with the present invention.

FIG. 2 shows fiber optic device 200 in side, cross-sectional view. A housing comprising, in one example, strain reliefs 120a and 120b, end caps 130a and 130b, and shell pieces 110a and 110b is provided to accommodate the input and output sections of the fiber, as well as additional, internal components. Dye/polymer composition 160 is shown in contact with the suspended, side-polished portion of fiber optic 30, and with an underlying controllable heating/cooling source 170 (TEC) which is mounted, via a thermally conductive epoxy 172, to an inside wall 112 of shell piece 110b. Note that fiber 30 may be completely suspended by the housing and completely surrounded by the polymer as shown, or the fiber may directly contact heating/cooling source 170 with the remainder surrounded by the polymer (not shown). A nonthermal-sinking structure (not shown) may be used to contain the polymer over the portion of the fiber.

As discussed above, a sensor (not shown) can be placed in material 160 (60, FIG. 1) to measure the resultant temperature thereof The optical energy level can be extracted from this temperature measurement by reference to predetermined device characteristics. The fiber can also be directly tapped with sensor(s) to directly measure the optical energy therein (by, e.g., demodulation)before/after attenuation, for example. The signals representing the temperature and/or optical energy levels can be carried from the device using sense leads (not shown). These signals can be used in a feedback loop to control the temperature of the heating/cooling source 170 (80, FIG. 1) using lead 105 of FIG. 1, and the desired level of optical energy in the fiber can therefore be attained in a variable manner during device operation.

As shown in FIG. 2, the suspension of the portion of the fiber 30 and dye/copolymer composition 160, without any other significant thermal contacts, results in an efficient, thermally insulated device, wherein any changes in temperature induced by the controllable heating/cooling source 170 are transferred solely, and quickly, to dye/copolymer material 160, but not to other surrounding structures.

This "blockless" technique stands in contrast to the prior technique described above in connection with FIG. 1, wherein the fiber is mounted in a block, and any thermal changes in the material are also affected by the heat sink characteristics of the block within which the side-polished fiber is mounted, and on which the material is formed. In the suspended fiber approach, the heat sink effect of surrounding structures is minimized, and faster and more predictable control of the temperature, and therefore the optical responses, are provided.

Consideration will now be given to the preparation of useful polar polyolefins and the novel dye-appended polymer compositions with preferred parameters and illustrative methods. Unless otherwise indicated, the reactants and reagents used in the reactions described below are readily available materials. Such materials can be conveniently prepared in accordance with conventional preparatory procedures or obtained from commercial sources. Optical characterization of the polyolefins and dye/polymer compositions described herein was done by applying the polymer or dye/polymer composition as an overlay on a side-polished optical fiber and measuring attenuation at 15 dB. It should be noted that the embodiments included and described herein are for illustrative purposes only, and the invention is in no way limited to the embodiments used in the examples.

Furthermore, process temperatures and times in the reactions described in the examples are not critical and can vary widely. For example, the polymerization reactions are carried out in an inert atmosphere, but may be conducted at room temperature or, alternatively, for a faster reaction time, at elevated temperatures up to about 150° C. Reaction times are influenced by the reactants, reactant temperature, the concentration of the reactants, catalyst, and other factors known to those of skill in the art.

I. Preparation of Dyes

A. Preparation of Platinum Dithiolene Dye (3)

EXAMPLE 1

Preparation of N-Acetoxyethyl-N-Methyl Aniline (7)

A 1 L flask was charged with 2-(N-methylanilino)ethanol (8) (151.3 g, 1 mole), methylene chloride (250 mL), and triethylamine (151 g, 1.48 mole). Acetic anhydride (153.35 g, 1.5 mole) was added to the solution at room temperature through an addition funnel. The product (7) was collected by vacuum distillation (122 g, bp 110° C. at 400 micron Hg).

EXAMPLE 2

Preparation of Benzil (6)

A 2 L flask was charged with aluminum trichloride (76.5 g, 0.573 mole) and methylene chloride (300 mL). The solution was cooled to −10° C., and aniline (7) (166.3 g, 0.86 mole) from Example 1 was added slowly over 30 min. via an addition funnel, followed by addition oxalyl chloride (18.2 g, 0.143 mole) over 30 min. The resulting solution was stirred at −5° C. for another hour, then at room temperature for 12 hours. The reaction mixture was poured to 1 kg of crushed ice, and the solution was then neutralized with 1 N sodium hydroxide. The organic layer was separated, and the solvent was removed. The residue was purified by passing it through an alumina column using a solvent containing 5% ethyl acetate, and 95% hexane. This yielded the desired benzil (6) as an yellow oil (40 g). Examples 1 and 2 are depicted in the following reaction scheme:

EXAMPLE 3

Preparation of Platinum Dithiolene Dye (5)

A 1 L flask was charged with benzil (6) (22.2 g, .0.05 mole), $P_2S_5$ (15.7 g, 0.07 mole) prepared in accordance with Example 2, and 1,3-dimethyl-2-imidazolidinone (DMI) (70 mL). The resulting solution was stirred at 80° C. for 2 hours. $K_2PtCl_4$ (8.37 g, 0.02 mole) was added to the solution via a powder addition funnel over 2 hours. The resulting solution was stirred at 80° C. for another 18 hours, and then quenched with 10% aqueous sodium bicarbonate solution (500 mL). The residue was collected and washed with methanol, providing the desired dye (5) (6 g).

EXAMPLE 4

Preparation of Platinum Dithiolene Dye (3)

A 500 mL flask was charged with dye (5) (2 g) prepared in accordance with Example 3, tetrahydrofuran (THF) (100 mL), methanol (100 mL), water (60 mL), and potassium carbonate (9 g). The resulting mixture was stirred at 50° C. for 2 hours. The solvent was removed, and the green residue was collected by filtration. The green power was washed with water, and dried in vacuum oven at 80° C. for 12 hours. This gave the desired dye (3) (1.4 g) from which dye moiety (I) is derived. The reaction scheme for Examples 3 and 4 is:

B. Preparation of Platinum Dye for Moiety (II)

EXAMPLE 5

A dye from which structural moiety (II) above may be derived can be prepared according to the following reaction scheme:

In this example, each $R_1$ of structural moiety (II), is methyl (C=1)

C. Preparation of Platinum Dye for Moiety (III)

EXAMPLE 6

A dye from which structural moiety (III) above may be derived can be prepared according to the following reaction scheme:

-continued

D. Preparation of Platinum Dye for Moiety (IV)

EXAMPLE 7

A dye from which structural moiety (IV) above may be derived can be prepared according to the following reaction scheme:

E. Preparation of Platinum Dye for Moiety (V)

EXAMPLE 8

A dye from which structural moiety (V) above may be derived can be prepared according to the following reaction scheme:

In this example n=6, and Z is oxygen (O) in dye moiety (V).

II. Preparation of Dye-Appended Polymer (1)

The free radical polymerization of polar olefin monomers for use in the present invention may be accomplished by mixing the desired ratio of monomers with a catalyst, such as 2,2'-azobisisobutyronitrile (about 2 mole %). When the copolymer is to be chemically bonded to the dye component, a carboxylic acid, such as 3-mercaptopropionic acid, is reacted with the copolymer to provide a linking moiety for attaching to dye. To prepare the detached copolymer, a chain terminating reagent, such as 1-dodecanethiol, is employed during the polymerization reaction.

EXAMPLE 9

Preparation of Carboxylic Acid Ended Copolymer (4)

A 100 mL flask was charged with 60 wt. % methyl acrylate (MA) (12 g, 0.139 mol) and 40 wt. % tetrafluoropropyl acrylate (TFPA) (8 g, 0.043 mol). 2,2'-Azobisisobutyronitrile (0.6 g), 3-mercaptopropionic acid (0.77 g, 7.2 mmol), and toluene (10 mL) were added to the mixture and stirred with a magnetic stirrer. The solution was degassed, filled with argon, and heated at 70° C. for 12 hours. A viscous solution of the copolymer was formed. The copolymer was concentrated and dried in a vacuum oven at 120° C. for 8 hours. 19.5 Grams of copolymer (4) below were obtained.

EXAMPLE 10

Preparation of Dye Appended Polymer (1)

A 100 mL flask was charged with carboxylic acid ended copolymer (4) (10 g, 2.85 mmol) of Example 5, toluene (20 mL) and oxalyl chloride (1.8 g, 14.3 mmol). The solution was stirred at room temperature for 3 hours. Toluene and excess oxalyl chloride were removed by distillation to yield a viscous gum. A solution of Pt- dithiolene dye (3)(0.462 g, 0.48 mmol) from Example 4 in dimethylformamide (DMF) (10 mL) was then added to this viscous gum, and the solution was stirred overnight to yield dye-appended copolymer (1). The polymer solution was precipitated into aqueous sodium bicarbonate solution. The dye appended copolymer was collected and dried in a vacuum oven to obtain 9 g of appended copolymer/dye (1). The reaction is depicted as:

III. Synthesis of Dye/Polymer Composition

(Dye Appended Copolymer (1) and Detached Refractive Index Matching Copolymer (2))

As stated above, during the polymerization to prepare a polar olefin copolymer detached from the dye, a chain terminating reagent, such as an alkyl thiol, is added in the reaction mixture. As used herein, alkyl refers to saturated hydrocarbon residues containing up to twenty carbons in straight or branched chains, as well as cyclic structures when possible. Any alkyl thiol may be used as the chain transfer agent, but due to its unobtrusive odor, 1-dodecanethiol is often employed. During the process, the alkyl portion of the aforementioned alkyl thiol detaches from the thiol moiety and attaches to each end of the polymer, thereby terminating further polymerization. The amount of the chain transfer agent added to the reaction controls the molecular weight of the polymeric product. Typically, from about 0.5 to about 20 mole % of alkyl thiol chain transfer agent is added to the mixture, but about 10 mole % is preferred. These amounts translate into polyolefins having molecular weights (Mw) that range from about 1,500 g/mole when 20 mole % 1-dodecanethiol is used to about 50,000 g/mole when 0.5 mole % is employed.

EXAMPLE 11
Preparation of Refractive Index Matching Copolymer (2)

A 100 mL flask was charged with 60 wt. % methyl acrylate (MA) (12 g, 0.139 mol) and 40 wt. % tetrafluropropyl acrylate (TFPA) (8 g, 0.043 mol), and the reaction mixture was stirred with 2,2' azobisisobutyronitrile catalyst (0.6 g), 1-dodecanethiol (1.48 g, 7.3 mmol), and toluene (10 mL) using a magnetic stirrer. The solution was degassed, filled with argon, and heated at 70° C. for 12 hours. By this time a viscous solution of the copolymer was formed. The copolymer was concentrated and dried in a vacuum oven at 120° C. for 8 hours obtaining 18 g of copolymer (2). Polyolefin (2) also included a terminating alkyl residue (C=12) appended at each end, which came from the addition of 1 to 20 mole % 1-dodecanethiol during the polymerization reaction.

2

EXAMPLE 12

Blending of Polymer (1) and Polymer (2) to Obtain the Dye/Polymer Composition

The spectral uniformities at 15 dB of attenuation for dye-appended copolymer (1) and detached copolymer (2) on a side polished glass fiber (90% coupling strength) were measured in the spectral window from 1530 nm to 1560 nm. The results of the measurements were:

Spectral Flatness at −15 dB for Polymer (1): $a^1 = +2.4$ dB

Spectral Flatness at −15 dB for Polymer (2): $a^2 = -6.5$ dB

The equation set forth previously was used to determine the amounts of polymer (1) and polymer (2) that should be mixed together to obtain a dye/copolymer composition having a substantially uniform spectral response across the wavelength band, where m is the weight fraction of polymer (1), and (1−m) is the weight fraction of polymer (2). For the blending process m satisfies the following equation:

$$2.4\,m + (1-m)(-6.5) = 0$$

$$m = 0.73$$

Thus, 0.73 g of dye-appended polymer (1) and 0.27 g of polymer (2) were dissolved in 10 mL of dichloromethane. After the solution became homogenous, the solvent was removed, and the polymer blend was dried in a vacuum oven at 100° C. for 8 hours. The Spectral Flatness at 15 dB of attenuation was measured again. The blending iteration described above was repeated 3 more times until the Spectral Flatness at 15 dB of attenuation was <0.2 dB.

The spectral response, or attenuation, for the dye/copolymer composition of Example 12, remained substantially constant across the wavelength band, e.g. 1520 to 1560 nm, indicating that the dispersions of the optical fiber and blended dye/polymer composition were also substantially matched or dispersion-matched.

Each of the patents and patent applications cited herein is incorporated herein by reference in its entirety.

While the invention has been particularly shown and described with reference to preferred embodiment(s) thereof, it will be understood by those skilled in the art that various changes in form and details may be made therein without departing from the spirit and scope of the invention.

We claim:

1. A dye/polymer composition comprising:
   (a) an infrared absorbing dye component having an absorption maximum from about 900 to about 1300 nm; and
   (b) a copolymer component comprising at least one appended polar olefin copolymer chemically bonded to said dye component through a linking moiety attached to one chain end of said at least one appended polar olefin copolymer, wherein said at least one appended polar olefin copolymer comprises monomeric units derived from two or more polar olefins having an ester, benzene or halogen substituent attached thereto.

2. The dye/polymer composition of claim 1 comprising from about 0.2 to about 10% by weight of said infrared absorbing dye component and from about 90 to about 99.8% by weight of said copolymer component.

3. The dye/polymer composition of claim 1, wherein each of said two or more polar olefins is selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

4. The dye/polymer composition of claim 1, wherein said infrared absorbing dye component is selected from the group of moieties having structures (I), (II), (III), (IV), or (V)

-continued wherein each wavy line indicates a point of attachment to said appended copolymer component;

Met is selected from the group consisting of nickel, palladium and platinum;

each $R^1$ is independently a lower alkyl group containing 1 to 12 carbon atoms;

Z is oxygen (O) or sulfur (S); and n is 2 to 12.

5. The dye/polymer composition of claim 4, wherein each of said two or more polar olefins is selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

6. The dye/polymer composition of claim 5, wherein the molecular weight of said at least one appended polar olefin copolymer is about 10,000 g/mole or higher.

7. The dye/polymer composition of claim 6 comprising structure (VI)

wherein said infrared absorbing dye component is structural moiety (I), each $R^1$ is methyl, said linking moiety is structure (L)

(L)

wherein the wavy line on the left side of structure (L) indicates the point of attachment to said one chain end of said at least one appended polar olefin copolymer, and the wavy line on the right side of structure (L) indicates the point of attachment to said structural dye moiety (I); wherein $(A^1)$ and $(A^2)$ are each independently said selected monomeric units of said at least one appended polar olefin copolymer, and wherein 1−x is the mole fraction of said monomeric units $(A^1)$, and x is the mole fraction of said monomer units $(A^2)$, wherein x has a numeric value from 0.1 to about 0.9.

8. The dye/polymer composition of claim 7, wherein Met is platinum, $A^1$ is derived from methyl acrylate, and $A^2$ is derived from tetrafluoropropyl acrylate.

9. The dye/polymer composition of claim 5 comprising from about 10 wt. % to about 100 wt. % of a dye-appended polar olefin copolymer comprising said dye component chemically bonded to said at least one appended polar olefin copolymer through said linking moiety; and from about 0 to about 90 wt. % of a detached polar olefin copolymer;

wherein said copolymer component comprises said at least one appended polar olefin copolymer and said detached polar olefin copolymer; and wherein said detached polar olefin copolymer comprises monomeric units derived from two or more polar olefins selected from the group consisting of tetrafluoropropyl acrylate, tetrafluoropropyl methacrylate, butyl acrylate, hexyl acrylate, trifluoroethyl methacrylate, lauryl acrylate, pentafluorostyrene, pentafluorophenyl acrylate, methyl acrylate, N,N-dimethylacrylamide, pentafluorophenyl methacrylate, methyl methacrylate, and vinylidene chloride.

10. The dye/polymer composition of claim 9, wherein said selected monomeric units in said detached polar olefin copolymer are the same as and are present in the same amounts as those in said appended polar olefin copolymer.

11. The dye/polymer composition of claim 9 comprising from about 0.2 to about 10% by weight of said infrared absorbing dye component and from about 90 to about 99.8% by weight of said copolymer component.

12. The dye/polymer composition of claim 9, wherein the relative amounts of said dye-appended copolymer and said detached copolymer, when present, are calculated using the following equation:

$$a^1 m + (1-m)(a^2) = 0$$

wherein each a and $a^2$, respectively, is the measured spectral response in decibels of said dye-appended copolymer and said detached copolymer, respectively, across a wavelength region; wherein m is the weight fraction of said dye-appended polymer, and (1–m) is the weight fraction of said detached copolymer.

13. The dye/polymer composition of claim 9 comprising said dye-appended polymer having structure (VI) and said detached polar olefin copolymer having structure (VII)

(VI)

wherein said infrared absorbing dye component is structural moiety (I), each $R^1$ is methyl; said linking moiety is structure (L)

(L)

wherein the wavy line on the left side of structure (L) indicates the point of attachment to one end of said copolymer, and the wavy line on the right side of structure (L) indicates the point of attachment to said structural dye moiety (I); wherein structure (VII) is (VII)

wherein ($A^1$) and ($A^2$) each independently represent said monomeric units of said appended polar olefin copolymer and said detached polar olefin copolymer, and wherein 1–x is the mole fraction of said monomeric units ($A^1$) and x is the mole fraction of said monomer units ($A^2$), wherein x has a numeric value from about 0.1 to about 0.9.

14. The dye/polymer composition of claim 13 comprising:
   about 2 parts by weight of said structure (VI) comprising said dye-appended polar olefin copolymer; and
   about 1 part by weight of said structure (VII) comprising said detached polar olefin copolymer.

15. The dye/polymer composition of claim 13, wherein Met is platinum, $A^1$ is derived from methyl acrylate, and $A^2$ is derived from tetrafluoropropyl acrylate.

16. The dye/polymer composition of claim 15, wherein x is about 0.2 and 1–x is about 0.8.

17. The dye/polymer composition of claim 15, wherein said monomeric units $A^1$ and $A^2$ are derived from about 60 wt. % methyl acrylate and about 40 wt. % tetrafluoropropyl acrylate, respectively.

18. A broadband optical device comprising.
   (a) a portion of an optical fiber through which optical energy can propagate, wherein said portion of said optical fiber has a surface through which at least some of said optical energy can be extracted; and
   (b) the dye/polymer composition of claim 1 overlying said surface.

19. The broadband optical device of claim 18, wherein the spectral response of said broadband optical device across a wavelength band is substantially uniform.

20. The broadband optical device of claim 18, further comprising a controllable heating/cooling source in contact with said dye/polymer composition, wherein said controllable heating/cooling source provides a controllable stimulus to said dye/polymer composition to change the temperature thereof.

21. A broadband optical device comprising:
   (a) a portion of an optical fiber through which optical energy can propagate, wherein said portion of said optical fiber has a surface through which at least some of said optical energy can be extracted; and
   (b) the dye/polymer composition of claim 9 overlying said surface.

22. The broadband optical device of claim 21, wherein the spectral response of said broadband optical device across a wavelength band is substantially uniform.

23. The broadband optical device of claim 21, further comprising a controllable heating/cooling source in contact with said dye/polymer composition, wherein said controllable heating/cooling source provides a controllable stimulus to said dye/polymer composition to change the temperature thereof.

* * * * *

UNITED STATES PATENT AND TRADEMARK OFFICE
CERTIFICATE OF CORRECTION

PATENT NO.    : 6,489,399 B1
DATED         : December 3, 2002
INVENTOR(S)   : Chan et al.

It is certified that error appears in the above-identified patent and that said Letters Patent is hereby corrected as shown below:

Column 27,
Line 13, delete "aand" and insert -- -a$^1$ and --

Signed and Sealed this

Fourth Day of March, 2003

JAMES E. ROGAN
*Director of the United States Patent and Trademark Office*